(12) United States Patent
Schmitt et al.

(10) Patent No.: US 11,816,989 B2
(45) Date of Patent: Nov. 14, 2023

(54) IDENTIFICATION OF CONNECTION PATTERNS ON THE BASIS OF TRAJECTORY DATA

(71) Applicant: Robert Bosch GmbH, Stuttgart (DE)

(72) Inventors: Andreas Schmitt, Hannover (DE); Ming Gao, Harsum (DE); Oliver Roeth, Elze (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/832,132

(22) Filed: Jun. 3, 2022

(65) Prior Publication Data
US 2023/0028461 A1    Jan. 26, 2023

(51) Int. Cl.
| | |
|---|---|
| G08G 1/09 | (2006.01) |
| G08G 1/0968 | (2006.01) |
| G08G 1/0967 | (2006.01) |
| B60W 60/00 | (2020.01) |

(52) U.S. Cl.
CPC ... *G08G 1/096811* (2013.01); *B60W 60/0011* (2020.02); *G08G 1/096725* (2013.01); *G08G 1/096791* (2013.01); *B60W 2555/60* (2020.02)

(58) Field of Classification Search
CPC ....... G08G 1/096811; G08G 1/096725; G08G 1/096791; B60W 60/0011; B60W 2555/60; G01C 21/3815
See application file for complete search history.

(56) References Cited

U.S. PATENT DOCUMENTS

2022/0357180 A1\* 11/2022 van der Laan .... G01C 21/3826

\* cited by examiner

*Primary Examiner* — Michael V Kerrigan
(74) *Attorney, Agent, or Firm* — NORTON ROSE FULBRIGHT US LLP; Gerard Messina

(57) ABSTRACT

A method for selecting at least one connection pattern drivable by road users using a control device. Trajectory data are received from at least one area. On the basis of the received trajectory data, starting points and end points of drivable trajectories are determined. All the connection patterns between the starting points and the end points of the drivable trajectories are determined in the form of connecting lines. The determined connection patterns are filtered by at least one filter. Connection patterns remaining after filtering are compared with route profiles from the trajectory data. For each remaining connection pattern a number of route profiles which correspond to the connection pattern are counted. A connection pattern with the highest number of matching route profiles is selected. A control device, a computer program, and a machine-readable storage medium are also described.

11 Claims, 4 Drawing Sheets

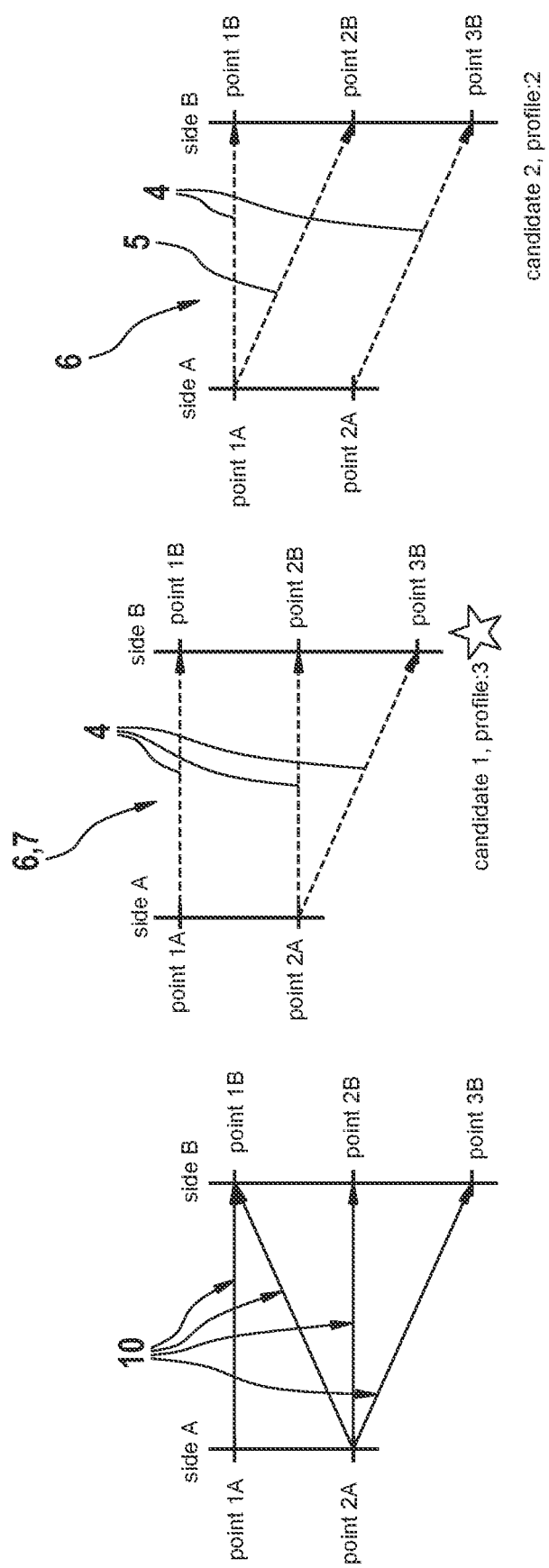

IDENTIFICATION OF CONNECTION PATTERNS ON THE BASIS OF TRAJECTORY DATA

CROSS REFERENCE

The present application claims the benefit under 35 U.S.C. § 119 of German Patent Application No. DE 10 2021 207 528.2 filed on Jul. 15, 2021, which is expressly incorporated herein by reference in its entirety.

FIELD

The present invention relates to a method for identifying and selecting at least one connection pattern drivable by road users. The present invention furthermore relates to a control device, to a computer program and to a machine-readable storage medium.

BACKGROUND INFORMATION

In self-driving vehicles, a plurality of measurement data is gathered to enable automated driving along trajectories. In the process, trajectory data are also determined which consist for example of points provided with timestamps. Such points may be configured as geographic coordinates and determined on a GNSS basis.

Trajectory data detected by different vehicles map a specific connection pattern or connectivity pattern of drivable routes, such as for example lanes on a road, in traffic infrastructure.

The identification of such a connection pattern is essential for the digitalization of traffic infrastructure with trajectory data. Starting from the assumption that starting points and end points of drivable routes are obtained from trajectory data for a traffic region or an area, the purpose of identifying connection patterns or connectivity patterns is to find the optimum connections between these points which are best supported by the trajectory data. Technically simple methods are available for determining connection patterns which connect all starting points with all end points. However, such connection patterns also have connections between starting points and end points which are not supported by the trajectory data and thus require post-processing. Moreover, methods are available which, in the context of technically complex satellite image evaluation, combine the topographical profiles of roads with the trajectory data to generate connection patterns.

SUMMARY

An object of the present invention is to provide a method for robust generation of connection patterns which is based solely on received trajectory data.

This object may achieved by means of the respective subjects of the present invention. Advantageous configurations of the present invention are disclosed herein.

One aspect of the present invention provides a method for determining and selecting at least one connection pattern drivable by road users. The method may preferably be carried out by a control device.

In accordance with an example embodiment of the present invention, in one step, trajectory data are received from at least one area. The trajectory data may preferably be received from vehicles. On the basis of the received trajectory data, starting points and end points of drivable trajectories are determined. All connection patterns between the starting points and the end points of the drivable trajectories are in this case determined in the form of one or more connecting lines. The determined connection patterns are filtered by at least one filter. Connection patterns remaining after filtering are compared with route profiles from the trajectory data, wherein for each remaining connection pattern a number of route profiles are selected which correspond to the connection patterns. A connection pattern with the highest number of matching route profiles is then selected.

The selected connection pattern may be used, for example, for digital mapping.

Starting from the assumption that starting points and end points of drivable routes are obtained from trajectory data for a traffic region or an area, the purpose of identifying connection patterns or connectivity patterns is to find the optimum connections between these points which are best supported by the trajectory data. This allows a topological representation of drivable routes in traffic infrastructure comprising a length of several tens of meters up to a number of kilometers, such as for example a public highway. The starting points and end points of drivable routes may be determined by segmenting the trajectories and clustering the segmented trajectory points. In this way, modeling of the topological representation of a relatively large traffic scenario, such as for example all the roads open to vehicle traffic in a town, can be broken down into modeling of small traffic regions with lengths from a few tens of meters up to a number of kilometers. The method according to the present invention is applicable to each of these orders of magnitude and areas. The topological representations of these areas may be connected together by tracking or following their connections within the connection patterns, in order to obtain a digital result for an area. Tracking of the connections between the respective segmented areas proceeds between the end points and the starting points of the respective areas.

Using the method according to the present invention, connection patterns between different areas can be established in a rules-based manner. The rules may be used to define the possible connection patterns between the starting points and the end points and are applied in the form of filters to the determined connection patterns. Thus, connection patterns which are not technically appropriate or are legally inadmissible can be excluded in advance from further processing.

The areas are preferably vehicle environments to be mapped, such as for example towns, villages, rural highways, freeways, industrial sites, car parks and the like.

The method of the present invention may act solely on the basis of the received trajectory data and does not require any training of machine learning algorithms. The method is not restricted to specific traffic scenarios, such as for example junctions, and may also identify and process abnormal connection patterns, such as for example in the case of lane change trajectories.

The trajectory data or trajectory measurement data are preferably positions provided with a timestamp over which vehicles have driven in one or a plurality of areas.

A further aspect of the present invention provides a control device, wherein the control device is configured to carry out the method. The control device may for example be a control device in the vehicle, a control device outside the vehicle or a server unit outside the vehicle, such as for example a cloud storage system.

Furthermore, one aspect of the present invention provides a computer program which includes commands that, in response to execution of the computer program by a computer or a control device, causes the latter to carry out the method according to the present invention. A further aspect of the present invention provides a machine-readable storage medium on which the computer program according to the present invention is stored.

The vehicles may be assisted, partially automated, highly automated and/or fully automated or driverless, as per the German Federal Highway Research Institute (BASt) standard.

The vehicles may in particular be configured for example as passenger cars, trucks, robotaxis and the like. The vehicles are not limited to operation on roads. Rather, the vehicles may also be configured as watercraft, aircraft, such as for example delivery drones, and the like.

In one exemplary embodiment of the present invention, the connection patterns between the starting points and end points of the drivable trajectories are determined in the form of single or multiple connecting lines between at least one starting point and at least one end point. A connection pattern has one or more connections between a starting point and an end point. In this respect, different connection patterns comprise connections or connecting lines between different starting points and end points. Thus, the different possible connection patterns may be defined as connection possibilities between the different starting points and end points.

According to a further example embodiment of the present invention, the connection possibilities are filtered by at least one filter configured as a rule. One or more rules in the form of at least one filter may be applied to the possible connection patterns. The rules for filtering the connection patterns may be extended and adapted according to the particular application. Different rules may be used depending on the particular application. These rules may be adapted or varied for example as a function of country or region.

According to a further exemplary embodiment of the present invention, at least one connection possibility is maintained if it corresponds to the at least one rule. Thus, the only connection possibilities approved for further processing are those which correspond to the at least one rule of the filter. Any connection possibilities which are inconsistent with the rules are discarded.

According to a further example embodiment of the present invention, one rule which is applied is the exclusion of two connecting lines crossing. This measure for example prevents two lanes running in opposite directions from being merged.

According to a further exemplary embodiment of the present invention, one rule which is applied is the exclusion of a connection being created between two connections which run parallel to one another. This prevents a lane change between two lanes which run parallel to one another.

According to a further example embodiment of the present invention, country-specific road engineering regulations are applied as at least one rule. In this respect, different rules and regulations may be taken into account when evaluating the possible connection patterns in order for example to exclude in advance legally prohibited connection patterns and to accelerate evaluation.

According to a further exemplary embodiment of the present invention, in the case of a determined number of starting points corresponding to the number of end points, a connection pattern may be selected which has parallel running connecting lines between the starting points and the end points. This configuration corresponds to a special case which leads to accelerated interpretation and selection of a connection pattern. If the number of determined starting points and end points, for example at a junction, is equal, a connection pattern may be selected which comprises parallel running connecting lines which connect the respective starting points with the end points. The connection patterns thus have a plurality of connecting lines which run parallel to one another. Selection of a connection pattern from a plurality of possible connection patterns is thus not necessary.

According to a further example embodiment of the present invention, the possible connection patterns or connection possibilities are formatted as a matrix or a table, wherein the matrix or table has all possible connecting lines between all starting points and all end points. In this way, the possible connection patterns may be technically simply combined and further processed.

Preferred exemplary embodiments of the present invention are explained in greater detail below with reference to greatly simplified schematic representations.

BRIEF DESCRIPTION OF THE DRAWINGS

FIGS. 4-6 show schematic representations for clarifying further processing by the method after a filter step, in accordance with an example embodiment of the present invention.

DETAILED DESCRIPTION OF EXAMPLE EMBODIMENTS

FIGS. 1 to 7 illustrate the method according to the present invention for selecting at least one connection pattern drivable by road users.

Figure 1:
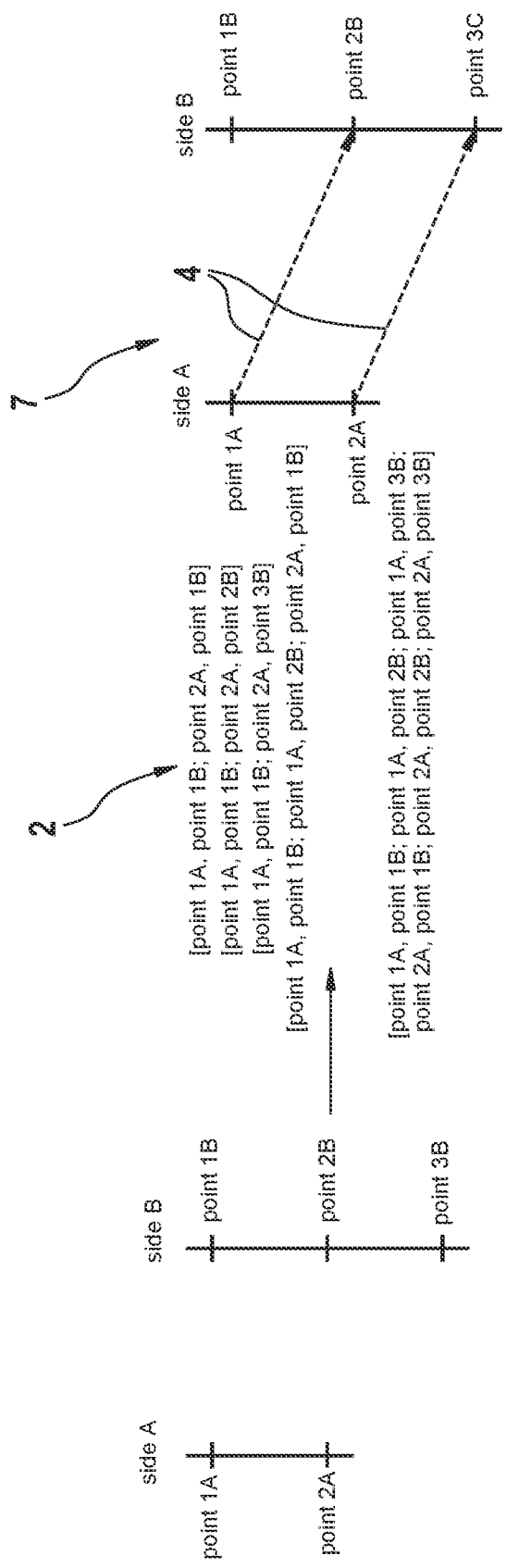
FIG. 1 is a schematic representation for illustrating a method according to the present invention according to one example embodiment.

FIG. 1 is a schematic representation for illustrating a method according to the present invention according to one embodiment. Starting points 1A, 2A and end points 1B, 2B, 3B are shown therein which were determined from trajectory data from at least one area. The starting points 1A, 2A and the end points 1B, 2B, 3B may for example be determined using cluster analysis. The starting points 1A, 2A and the end points 1B, 2B, 3B are numbered in the exemplary embodiment shown and are arranged on two sides A, B of a junction, for example between two map portions.

In one step of the method, all the connection patterns 2 between the starting points 1A, 2A and the end points 1B, 2B, 3B of the drivable trajectories are determined in the form of connecting lines 4. The possible connection patterns 2 or connection possibilities are illustrated as a matrix or as a table. Each line forms a connection pattern 2 which consists in each case of a plurality of connecting lines 4.

After filtering and processing the possible connection patterns 2, a final connection patterns 7 is selected. In the exemplary embodiment shown, a connection pattern 7 with two connecting lines 4 is selected.

Figure 3:
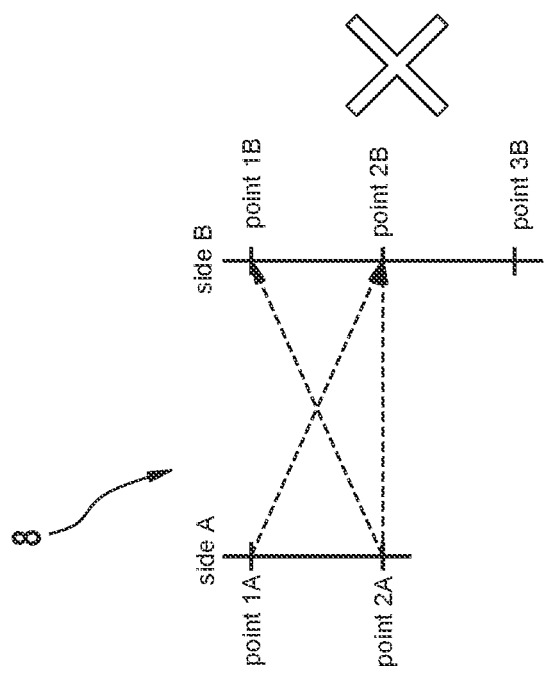
FIGS. 2 and 3 show schematic representations of non-permitted connection patterns.
Figure 2:
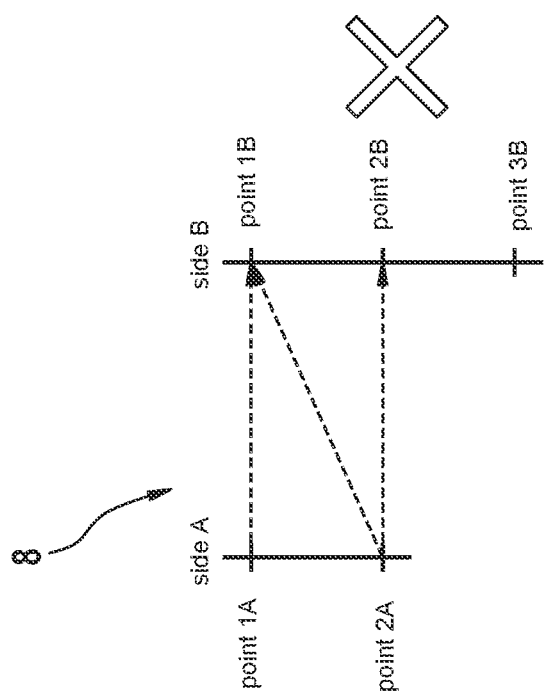

FIGS. 2 and 3 show schematic representations of non-permitted connection patterns 8. The determined connection patterns 2 are filtered by at least one filter. The at least one filter in this case implements rules, such as for example country-specific guidelines or basic rules for road engineering, whereby the maximum possible number of connection patterns 2 is reduced. FIG. 2 shows an exemplary connection pattern 8 which is deleted by a filter since connecting two connections or connecting lines 4 which run parallel to one another is not admissible according to road engineering guidelines. Similarly, the connection pattern 8 shown in FIG. 3 is conventionally inadmissible in road engineering, since two parallel lanes cross.

In one method step, therefore, the only connection patterns 6 maintained are those which correspond to the rules defined in advance. All other (inadmissible) connection patterns 8 are filtered out by the at least one filtering step or excluded from further processing. The rules used to implement the filtering step may be adapted or extended as desired in order reliably to allow the linking of map portions from different vehicle environments.

FIGS. 4, 5, and 6 show schematic representations for clarifying further processing by the method according to the present invention after a filtering step. FIG. 4 shows all received route profiles 10 or trajectories based on the received trajectory data.

Connection patterns 6 remaining after filtering are compared with route profiles 10 from the trajectory data. FIGS. 5 and 6 in each case show a connection pattern 6 which remains after the filtering step and is admissible in accordance with the predefined rules.

The remaining connection patterns 6 from FIGS. 5 and 6 are compared with the route profiles 10 of vehicles (not shown). For every remaining connection pattern 6, the number of route profiles 10 which substantially correspond to the connection pattern 6 and the connecting lines 4 of the connecting pattern 6 are counted (votes).

A connection pattern 7 with the highest number (votes) of matching route profiles 10 is then selected. In the exemplary embodiment shown, the connection pattern 7 shown in FIG. 5 has the highest number of supporting route profiles 10 and is thus used for linking the two map portions (Side A, Side B).

The connection pattern 6 shown in FIG. 6 has a connecting line 5 which does not occur in the route profiles 10 shown in FIG. 4. Thus, in contrast to the connection pattern 7 shown in FIG. 5, a smaller number of connecting lines 4, 5 are supported by the route profiles 10.

Figure 7:
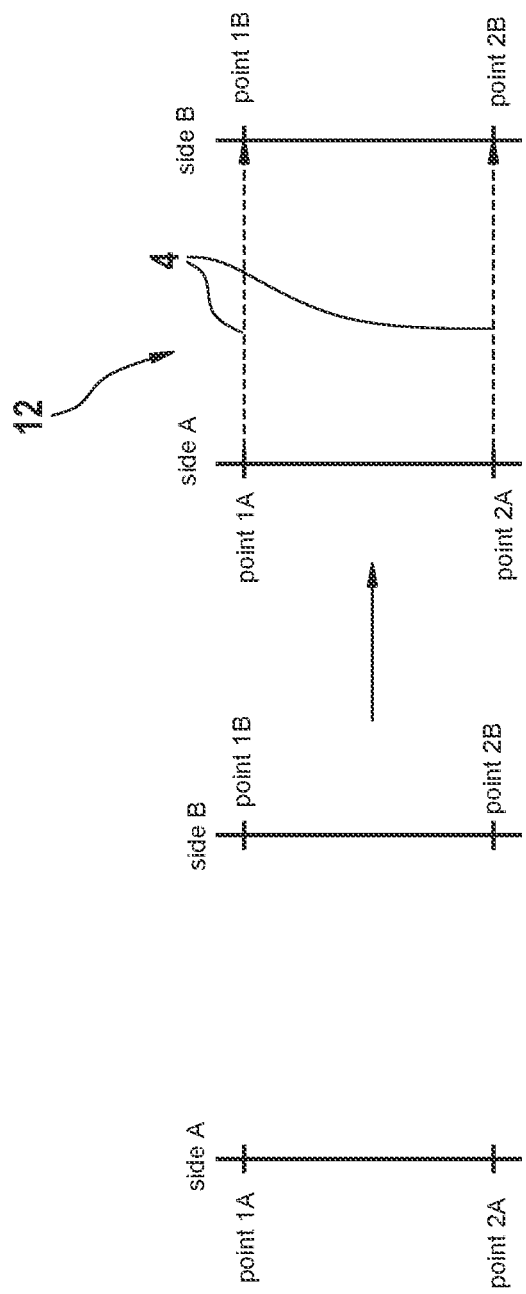
FIG. 7 shows schematic representations for illustrating a special case of the method according to a further example embodiment of the present invention.

FIG. 7 shows schematic representations for illustrating a special case of the method according to a further embodiment. If a determined number of starting points (1A, 2A) corresponds to a number of end points (1B, 2B), evaluation of the connection patterns 2 can be accelerated. In such a case, a connection pattern 12 with parallel running connecting lines 4 between the starting points (1A, 2A) and the end points (1B, 2B) is directly selected.

It is clear that a list of the respective starting points (1A, 2A) and the end points (1B, 2B) ensures that no connection patterns 2 are left out prior to filtering. The set of rules or the at least one filter implements legal provisions and/or predefined guidelines, whereby a limited pool of candidates or connection patterns 6 is obtained. The at least one filter may be adapted to various traffic scenarios. Counting of the supporting trajectories or route profiles 10 corresponding to the connecting lines 4 admits the trajectory data as confirmation of optimum connection patterns 7 so as to obtain a well-founded result. The method according to the present invention thus enables adaptive and efficient assessment of the connectivity pattern or connection pattern of drivable routes in traffic infrastructure solely using trajectory data.

What is claimed is:

1. A method for selecting at least one connection pattern drivable by road users using a control device, the method comprising the following steps:
   receiving trajectory data from at least one area;
   determining, based on the received trajectory data, starting points and end points of drivable trajectories;
   determining all connection patterns between the starting points and the end points of the drivable trajectories, in the form of connecting lines;
   filtering the determined connection patterns by at least one filter;
   comparing connection patterns remaining after the filtering with route profiles from the trajectory data;
   counting, for each remaining connection pattern, a number of route profiles which correspond to the connection pattern; and
   selecting a connection pattern with a highest number of matching route profiles.

2. The method as recited in claim 1, wherein the connection patterns between the starting points and the end points of the drivable trajectories are determined in the form of single or multiple connecting lines between at least one starting point and at least one end point.

3. The method as recited in claim 1, wherein the connection patterns are filtered by at least one filter configured as a rule.

4. The method as recited in claim 3, wherein at least one connection pattern is maintained, when it corresponds to the least one rule.

5. The method as recited in claim 3, wherein one rule which is applied is exclusion of two connecting lines crossing.

6. The method as recited in claim 3, wherein one rule which is applied is exclusion of a connecting line between two connecting lines which run parallel to one another.

7. The method as recited in claim 3, wherein country-specific road engineering regulations are applied as at least one rule.

8. The method as recited in claim 1, wherein, in a case of a determined number of starting points corresponding to the number of end points, a connection pattern with parallel running connecting lines between the starting points and the end points is selected.

9. The method as recited in claim 1, wherein the determined connection patterns are formatted as a matrix or a table, wherein the matrix or table has all possible connecting lines between all starting points and all end points.

10. A control device configured to select at least one connection pattern drivable by road users using a control device, the control device configured to:
   receive trajectory data from at least one area;
   determine, based on the received trajectory data, starting points and end points of drivable trajectories;
   determine all connection patterns between the starting points and the end points of the drivable trajectories, in the form of connecting lines;
   filter the determined connection patterns by at least one filter;
   compare connection patterns remaining after the filtering with route profiles from the trajectory data;
   count, for each remaining connection pattern, a number of route profiles which correspond to the connection pattern; and
   select a connection pattern with a highest number of matching route profiles.

11. A non-transitory machine-readable storage medium on which is stored a computer program for selecting at least one connection pattern drivable by road users using a control device, the computer program, when executed by a computer or a control device, causing the computer or control device to perform the following steps:
- receiving trajectory data from at least one area;
- determining, based on the received trajectory data, starting points and end points of drivable trajectories;
- determining all connection patterns between the starting points and the end points of the drivable trajectories, in the form of connecting lines;
- filtering the determined connection patterns by at least one filter;
- comparing connection patterns remaining after the filtering with route profiles from the trajectory data;
- counting, for each remaining connection pattern, a number of route profiles which correspond to the connection pattern; and
- selecting a connection pattern with a highest number of matching route profiles.

* * * * *

UNITED STATES PATENT AND TRADEMARK OFFICE
CERTIFICATE OF CORRECTION

| | | |
|---|---|---|
| PATENT NO. | : 11,816,989 B2 | Page 1 of 1 |
| APPLICATION NO. | : 17/832132 | |
| DATED | : November 14, 2023 | |
| INVENTOR(S) | : Andreas Schmitt et al. | |

It is certified that error appears in the above-identified patent and that said Letters Patent is hereby corrected as shown below:

On the Title Page

Add Item (30) Foreign Application Priority Data:
-- July 15, 2021 (DE) 10 2021 207 528.2 --

Signed and Sealed this
Twenty-third Day of January, 2024

Katherine Kelly Vidal
*Director of the United States Patent and Trademark Office*